United States Patent
Shinagawa

(10) Patent No.: US 7,831,375 B2
(45) Date of Patent: Nov. 9, 2010

(54) ENGINE CONTROL DEVICE AND ENGINE CONTROL METHOD

(75) Inventor: Tomohiro Shinagawa, Sunto-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 50 days.

(21) Appl. No.: 12/416,360

(22) Filed: Apr. 1, 2009

(65) Prior Publication Data

US 2009/0241918 A1 Oct. 1, 2009

(30) Foreign Application Priority Data

Apr. 1, 2008 (JP) ............................ 2008-094529

(51) Int. Cl.
*F02M 25/07* (2006.01)
*F02B 47/08* (2006.01)
*G06F 19/00* (2006.01)
*F02D 17/02* (2006.01)
*F02P 5/15* (2006.01)

(52) U.S. Cl. .................. 701/108; 701/103; 123/568.11; 123/568.21; 123/198 F; 123/406.48

(58) Field of Classification Search ........... 123/198 DB, 123/198 F, 406.26, 406.45, 406.48, 481, 123/568.11, 568.21; 701/101–105, 108, 701/110, 111, 115

See application file for complete search history.

(56) References Cited

U.S. PATENT DOCUMENTS

| 5,337,719 | A | * | 8/1994 | Togai | .......................... | 123/478 |
| 6,430,492 | B2 | * | 8/2002 | Kotwicki et al. | ............... | 701/54 |
| 6,560,523 | B2 | * | 5/2003 | Kotwicki et al. | ............... | 701/54 |
| 6,827,062 | B2 | * | 12/2004 | Fukusako et al. | ...... | 123/406.33 |
| 7,246,597 | B2 | * | 7/2007 | Kuo et al. | ................... | 123/305 |
| 7,249,583 | B2 | * | 7/2007 | Bidner et al. | ............ | 123/198 F |
| 2009/0248277 | A1 | * | 10/2009 | Shinagawa et al. | .......... | 701/103 |

FOREIGN PATENT DOCUMENTS

| JP | 60045767 | | 3/1985 |
| JP | 05248216 | | 9/1993 |
| JP | 07279697 | | 10/1995 |
| JP | 08114133 | A | 5/1996 |
| JP | 2001041084 | | 2/2001 |
| JP | 2003184595 | | 7/2003 |
| JP | 2004027971 | | 1/2004 |
| JP | 2006249998 | A | 9/2006 |
| JP | 2007015653 | | 1/2007 |
| JP | 2007023793 | | 2/2007 |
| JP | 2007162594 | | 6/2007 |
| JP | 2007162606 | | 6/2007 |
| JP | 2008057559 | A | 3/2008 |

\* cited by examiner

*Primary Examiner*—Willis R Wolfe, Jr.
(74) *Attorney, Agent, or Firm*—Gifford, Krass, Sprinkle, Anderson & Citkowski, P.C.

(57) ABSTRACT

A multi-cylinder engine includes an EGR mechanism for introducing exhaust gas into intake air, and is capable of a partial cylinder operation in which combustion in a part of the cylinders is halted. The multi-cylinder engine includes an EGR rate control unit for setting an introduction rate at which the exhaust gas is introduced into the intake air to be lower in a first partial cylinder operating state in which the ignition intervals are unequal, than in a second partial cylinder operating state, in which ignition intervals among a plurality of operating cylinders are equal.

6 Claims, 3 Drawing Sheets

ENGINE CONTROL DEVICE AND ENGINE CONTROL METHOD

INCORPORATION BY REFERENCE

The disclosure of Japanese Patent Application No. 2008-94529 filed on Apr. 1, 2008 including the specification, drawings and abstract is incorporated herein by reference in its entirety.

BACKGROUND OF THE INVENTION

1. Field of the Invention

The invention relates to an engine control device and an engine control method for controlling an operation of a multi-cylinder engine that is capable of Exhaust Gas Recirculation (EGR) and a partial cylinder operation (also referred to as a reduced cylinder operation).

2. Description of the Related Art

For example, Japanese Patent Application Publication No. 60-45767 (JP-A-60-45767), No. 2000-170562 (JP-A-2000-170562), No. 2004-27971 (JP-A-2004-27971), No. 2007-162594 (JP-A-2007-162594), and so on disclose multi-cylinder engines capable of performing a partial cylinder operation. In JP-A-60-45767, for example, an EGR rate (EGRr) (the proportion of recirculated exhaust gas in an intake gas) in a partial cylinder operation is reduced below that of an full cylinder operation as a method of preventing deterioration of the drivability, which is caused by torque variation due to an increase in an combustion interval during the partial cylinder operation and combustion instability due to the effects of EGR.

In this type of engine, a vibration generation condition varies between the full cylinder operation and the partial cylinder operation, and therefore measures must be taken to reduce vibration and noise. During the partial cylinder operation in particular, the ignition/combustion interval among operating cylinders may not be constant (for example, in a virtual V-type four-cylinder operating condition in which two cylinders of a V-type six-cylinder engine are rested, or the like).

In this case, torque variation may occur due to variation in the intake air amount among the operating cylinders (see Japanese Patent Application Publication No. 2007-162606 (JP-A-2007-162606)). Hence, during a partial cylinder operation in which combustion occurs at unequal intervals, vibration and noise may increase. Moreover, as noted above, the implementation of EGR leads to combustion instability, and as a result, a further increase in vibration and noise may occur. Furthermore, variation may occur in the actual EGR rate of the operating cylinders due to variation in the intake condition of the operating cylinders, as described above, and as a result, vibration and noise may increase even further. Therefore, it is particularly important to take measures to reduce vibration and noise during a partial cylinder operation in which combustion occurs at unequal intervals.

SUMMARY OF THE INVENTION

The invention provides an engine control device and an engine control method that suppress vibration and noise more effectively in a multi-cylinder engine that performs a partial cylinder operation, in which combustion occurs at unequal intervals.

In a first aspect of the invention, a multi-cylinder engine includes an EGR mechanism for introducing exhaust gas into intake air, and is capable of a partial cylinder operation in which combustion in a part of the cylinders is halted.

An engine control device according to the first aspect of the invention includes a cylinder rest state setting unit. The cylinder rest state setting unit switches between a first partial cylinder operating state, in which ignition intervals among a plurality of operating cylinders are unequal, and a second partial cylinder operating state, in which the ignition intervals are equal, in accordance with an operating condition of the engine.

The engine control device further includes an EGR rate control unit that sets an introduction rate at which the exhaust gas is introduced into the intake air to be lower in the first partial cylinder operating state than in the second partial cylinder operating state.

The EGR rate control unit may set the introduction rate such that in the first partial cylinder operating state, combustion variation (combustion instability) in a reference cylinder, in which an actual introduction rate is highest of the plurality of operating cylinders, is limited.

Further, in the first partial cylinder operating state, the EGR rate control unit may set the introduction rate using a cylinder that is connected to an intake manifold shared with a resting cylinder and operates immediately before the resting cylinder in accordance with an ignition sequence as the reference cylinder.

The engine control device may further include an active mount control unit. The active mount control unit controls an operation of an active mount, and the active mount supports the multi-cylinder engine elastically and generates vibration that counteracts vibration caused by an operation of the engine.

Further, during the partial cylinder operation, the partial cylinder operating state setting unit may halt air intake and discharge operations in the resting cylinder by halting an operation of an intake-exhaust valve operating mechanism of the resting cylinder.

In the engine control device according to the first aspect of the invention, the EGR rate is limited in the first partial cylinder operating state in which combustion occurs at unequal intervals. As a result, vibration and noise occurring during a partial cylinder operation in which combustion occurs at unequal intervals are suppressed effectively.

Further, when the multi-cylinder engine is supported by the active mount, for example, large vibration and noise that cannot be suppressed completely by the active mount are effectively prevented. As a result, vibration and noise are suppressed effectively by the active mount.

A second aspect of the invention provides an engine control method for controlling a multi-cylinder engine. In this control method, a first partial cylinder operating state, in which combustion in at least one cylinder is halted such that ignition intervals among operating cylinders are unequal, and a second partial cylinder operating state, in which combustion in at least one cylinder is halted such that the ignition intervals among the operating cylinders are equal, are switched in accordance with an operating condition of the engine. Further, an introduction rate at which the exhaust gas is introduced into the intake air in an EGR mechanism is set to be lower in the first partial cylinder operating state than in the second partial cylinder operating state.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the invention will be described below with reference to the drawings.

Figure 1:
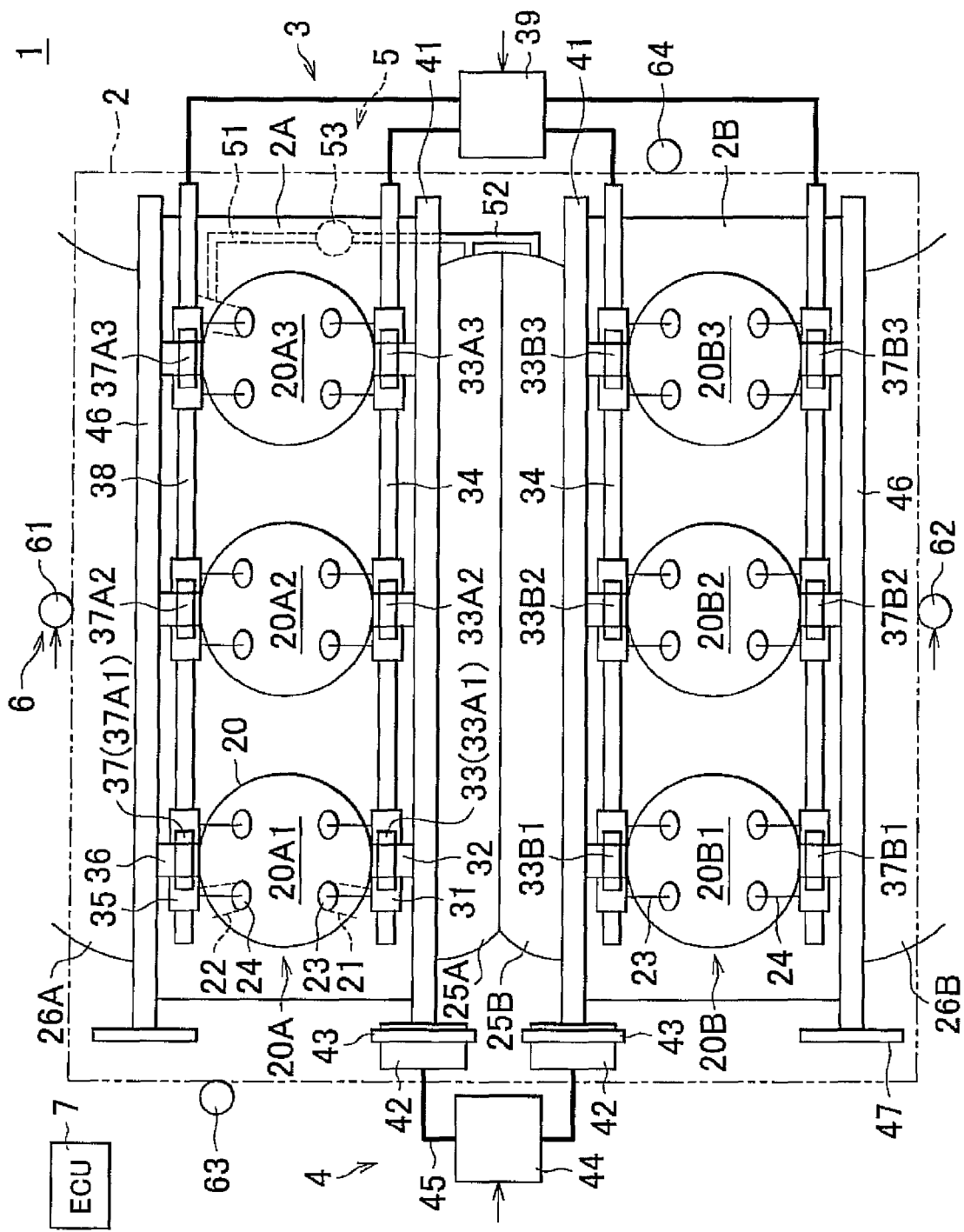
FIG. 1 is a schematic constitutional diagram of a four-cycle V-type six-cylinder reciprocating engine according to an embodiment of the invention.

FIG. 1 is a schematic constitutional diagram of a four-cycle V-type six-cylinder reciprocating engine 1 (to be abbreviated to "engine 1" hereafter) according to an embodiment of the invention. The engine 1 is capable of changing the number of operating cylinders in accordance with an operating condition generated or set by a driver and/or an operating state of a vehicle (engine), such as vehicle speed, engine speed, and so on (sometimes collectively referred to as "operating condition").

Referring to FIG. 1, the engine 1 includes an engine block 2 (including a first bank 2A and a second bank 2B), a valve rest setting unit 3, a valve driving unit 4, an EGR mechanism 5, an engine mount 6, and an engine electronic control unit 7 (to be abbreviated to "ECU 7" hereafter).

The first bank 2A and second bank 2B are provided in the engine block 2, which constitutes a main body of the engine 1, to form a V shape when seen from the side, and three cylinders 20 are provided in each of the banks 2A, 2B.

More specifically, a first bank cylinder group 20A is provided in the first bank 2A. The first bank cylinder group 20A includes a cylinder 20A1 (to be abbreviated to "A1 cylinder" hereafter), a cylinder 20A2 (to be abbreviated to "A2 cylinder" hereafter), and a cylinder 20A3 (to be abbreviated to "A3 cylinder" hereafter), and the A1 to A3 cylinders are disposed in parallel. Further, the A1 to A3 cylinders are disposed in series in a cylinder arrangement direction (the left-right direction of the drawing).

Further, a second bank cylinder group 20B is provided in the second bank 2B. The second bank cylinder group 20B includes a cylinder 20B1 (to be abbreviated to "B1 cylinder" hereafter), a cylinder 20B2 (to be abbreviated to "B2 cylinder" hereafter), and a cylinder 20B3 (to be abbreviated to "B3 cylinder" hereafter), and the B1 to B3 cylinders are also disposed in parallel and in series in the aforementioned cylinder arrangement direction.

An intake port 21 constituting an intake passage and an exhaust port 22 constituting an exhaust passage are provided in the engine block 2 to communicate with each cylinder 20. Further, an intake valve 23 and an exhaust valve 24 are attached to the engine block 2. The intake valve 23 opens and closes the intake port 21. The exhaust valve 24 opens and closes the exhaust port 22.

The intake ports 21 of the A1 to A3 cylinders are connected to a common intake manifold 25A. Further, the intake ports 21 of the B1 to B3 cylinders are connected to a common intake manifold 25B. Similarly, the exhaust ports 22 of the A1 to A3 cylinders are connected to a common exhaust manifold 26A, and the exhaust ports 22 of the B1 to B3 cylinders are connected to a common exhaust manifold 26B. Note that end portions of the intake manifolds 25A and 25B on an upstream side of an intake air flow direction are connected to each other.

The engine 1 according to this embodiment is operated in the following four operating modes: (1) an full cylinder operating mode in which fuel injection and ignition are performed in order of A1 cylinder-B2 cylinder-A3 cylinder-B3 cylinder-A2 cylinder-B1 cylinder; (2) a four-cylinder operating mode in which two cylinders from the ignition sequence described above, namely A1 and B3, are rested; (3) a three-cylinder operating mode in which the first bank cylinder group 20A and the second bank cylinder group 20B are rested alternately whenever this mode arrives; and (4) a two-cylinder operating mode in which two cylinders from the ignition sequence described above, namely A1 and B3, are used as the operating cylinders and the remaining cylinders are rested.

The valve rest setting unit 3 according to this embodiment halts the operations of the intake valve 23 and the exhaust valve 24 of the resting cylinder (causes the intake valve 23 and exhaust valve 24 to be kept closed) on the basis of an operating cylinder number determined by the ECU 7.

An intake main rocker arm 31, an intake sub-rocker arm 32, and an intake side connection switching unit 33 are provided for the intake valve 23 of each cylinder 20 and attached to an intake rocker shaft 34.

The intake main rocker arm 31 is supported by the intake rocker shaft 34 to be capable of rocking. Thus, the intake main rocker arm 31 opens the intake port 21 when the intake valve 23 is depressed and closes the intake port 21 when the pressure on the intake valve 23 is released. The intake sub-rocker arm 32 is supported by the intake rocker shaft 34 to be capable of rocking, and is rocked on the basis of the rotation of a cam, not shown in the drawing, which is provided in an intake camshaft 41 to be described below.

The intake side connection switching unit 33 switches the intake main rocker arm 31 and the intake sub-rocker arm 32 between a connected state and a disconnected state in accordance with an oil pressure supply condition. Intake side connection switching units 33A1, 33A2, 33A3, 33B1, 33B2, 33B3 are provided respectively for the cylinders A1 to B3. An oil passage for supplying oil pressure to the respective intake side connection switching units 33 is formed in the interior of the intake rocker shaft 34.

Similarly, an exhaust main rocker arm 35, an exhaust sub-rocker arm 36, and an exhaust side connection switching unit 37 are provided for the exhaust valve 24 of each cylinder 20 and attached to an exhaust rocker shaft 38. Exhaust side connection switching units 37A1, 37A2, 37A3, 37B1, 37B2, 37B3 are provided respectively for the cylinders A1 to B3.

The oil passages formed in the interior of the intake rocker shaft 34 and the exhaust rocker shaft 38 are connected to an oil pressure control unit 39. The oil pressure control unit 39 controls the oil pressure supply to the intake side connection switching units 33A1 to 33B3 and the exhaust side connection switching units 37A1 to 37B3.

The specific constitutions of the respective parts of the valve rest setting unit 3 are available (see Japanese Patent Application Publication No. 5-248216 (JP-A-5-248216), JP-A-2007-162606, and so on, for example), and therefore, description thereof has been omitted from this specification.

The valve driving unit 4 drives (opens and closes) the intake valve 23 and the exhaust valve 24 of the operating cylinder. The valve driving unit 4 is also capable of advancing and retarding the opening/closing timing of the intake valve 23. More specifically, in addition to the aforementioned intake camshaft 41, the valve driving unit 4 includes a valve timing controller 42, an intake timing gear 43, an oil pressure control unit 44, an oil passage 45, an exhaust camshaft 46, and an exhaust timing gear 47.

One end portion of the intake camshaft 41 is connected to the valve timing controller 42. The valve timing controller 42 includes a cylindrical housing having a central axis that matches a central axis of the intake camshaft 41. The valve timing controller 42 varies a valve timing continuously within a predetermined range by rotating the intake camshaft 41 relative to the aforementioned housing in accordance with the condition of oil pressure supply. The valve timing gear 43 is fixed to the housing of the valve timing controller 42.

A pair of the valve timing controllers 42 are connected to the oil pressure control unit 44 via the oil passage 45. The oil pressure control unit 44 advances and retards the opening/closing timing of the intake valve 23 by controlling the oil pressure supply to the valve timing controllers 42 on the basis of the valve timing determined by the ECU 7. The specific constitutions of the valve timing controller 42 and the oil pressure control unit 44 are available, and therefore, description thereof has been omitted from this specification.

The exhaust timing gear 47 is fixed to one end portion of the exhaust camshaft 46. The intake timing gear 43 and the exhaust timing gear 47 are connected to a crankshaft, not shown in the drawing, via a connection mechanism such as a chain, whereby the intake timing gear 43 and exhaust timing gear 47 are driven to rotate in synchronization with the rotation of the crankshaft.

The EGR mechanism 5 introduces exhaust gas discharged to the exhaust port 22 from the cylinders 20 into intake air, and includes a cylinder head interior EGR passage 51, an EGR pipe 52, and an EGR control valve 53.

The cylinder head interior EGR passage 51 is connected to the exhaust port 22 of the first bank 2A at one end and to the EGR pipe 52 at another end. The cylinder head interior EGR passage 51 is an EGR gas passage formed in a cylinder head of the engine block 2. The cylinder head interior EGR passage 51 branches off from the exhaust port 22 of the first bank 2A, and is therefore capable of extracting exhaust gas from the exhaust port 22.

The EGR pipe 52 is a pipe-shaped member provided on the exterior of the engine block 2. One end side of the EGR pipe 52 is connected to the cylinder head interior EGR passage 51. Another end side of the EGR pipe 52 bifurcates into two pipes that are connected to the intake manifolds 25A and 25B, respectively.

The EGR control valve 53 is attached to the engine block 2. The EGR control valve 53 is a solenoid valve provided at a midway point of the cylinder head interior EGR passage 51, and adjusts an EGR rate in accordance with the degree of opening/closing thereof.

The engine mount 6 supports the engine block 2. The engine mount 6 includes a first mount 61, a second mount 62, a third mount 63, and a fourth mount 64.

The first mount 61 and second mount 62 are arranged to be substantially orthogonal to the cylinder arrangement direction. The first mount 61 and second mount 62 are active mounts having an elastic support portion and an electric actuator so as to support the engine block 2 elastically and generate vibration that counteracts vibration generated by the engine block 2 during an operation of the engine (vibration having an opposite phase to the vibration generated by the engine block 2 during an operation of the engine). Meanwhile, the third mount 63 and the fourth mount 64 are arranged so as to be spaced from each other in the cylinder arrangement direction. The third mount 63 and fourth mount 64 are normal engine mounts that support the engine mount 2 elastically.

The ECU 7 is electrically connected to the oil pressure control unit 39, the oil pressure control unit 44, the EGR control valve 53, the first mount 61, the second mount 62, and so on, and controls the operations thereof. Note that the ECU 7 may be regarded as a cylinder rest state setting unit, an EGR rate control unit and an active mount control unit of the invention, and also as an engine control device of the invention including these units.

More specifically, when serving as the cylinder rest state setting unit of the invention, the ECU 7 controls the various units of the engine 1 such that in the full cylinder operating mode, fuel injection and ignition are performed in order of A1 cylinder-B2 cylinder-A3 cylinder-B3 cylinder-A2 cylinder-B1 cylinder. Further, in the three partial cylinder operating modes described above (i.e., four-cylinder operating mode, three-cylinder operating mode and two-cylinder operating mode, the ECU 7 halts fuel injection and ignition in the resting cylinders and halts the operations of the intake valve 23 and exhaust valve 24 of the resting cylinders.

Further, when serving as the EGR rate control unit of the invention, the ECU 7 according to this embodiment sets a target EGR rate on the basis of an engine speed, an engine load, and so on, and corrects the target EGR rate in accordance with the partial cylinder operating state.

Furthermore, when serving as the active mount control unit of the invention, the ECU 7 estimates a vibration condition generated by the engine 1 on the basis of an angular acceleration or the like of the crankshaft, and controls an operation of the engine mount 6 (the first mount 61 and second mount 62) to cause the engine mount 6 (the first mount 61 and second mount 62) to generate vibration having an opposite phase to the estimated vibration condition.

Next, an outline of an operation of the engine 1 according to this embodiment will be described.

On the basis of the operating condition and/or operating state of the engine 1, the ECU 7 determines the number of operating cylinders. Furthermore, by controlling the oil pressure control unit 39 in accordance with the number of operating cylinders, the ECU 7 halts the operations of the intake valve 23 and exhaust valve 24 in the resting cylinders and permits the operations (releases operation stoppage) of the intake valve 23 and exhaust valve 24 in the operating cylinders. Further, on the basis of the operating condition and/or operating state of the engine 1 and the number of operating cylinders, the ECU 7 controls the operations of various parts such as the valve timing controller 42 and the EGR control valve 53. Moreover, the ECU 7 estimates the vibration generation condition of the engine block 2 on the basis of the angular acceleration of the crankshaft, not shown in the drawing, and controls the operations of the first mount 61 and second mount 62 on the basis of the estimation result.

In the three-cylinder operating mode and the two-cylinder operating mode (second partial cylinder operating state), as well as the full cylinder operating mode, ignition (combustion) intervals of the operating cylinders are equal. During equal interval combustion, it is comparatively easy to estimate the vibration generation condition, and therefore active vibration/noise suppression can be performed favorably using the first mount 61 and the second mount 62.

In the four-cylinder operating mode (first partial cylinder operating state), on the other hand, the ignition (combustion) intervals of the operating cylinders are unequal. Moreover, in this operating mode, a torque deviation (torque variation) occurs among the operating cylinders for the following reason.

Specifically, in the B2 cylinder that immediately follows the resting A1 cylinder, no output is generated as a result of combustion in the immediately preceding A1 cylinder. Therefore, the torque generated by the B2 cylinder decreases below a normal level due to inertia in the crankshaft. In the following A3 cylinder, on the other hand, the crankshaft is accelerated by the combustion in the immediately preceding B2 cylinder, and therefore the torque reduction described above does not occur. Similarly, a torque reduction occurs in the A2 cylinder that immediately follows the resting B3 cylinder, whereas a torque reduction does not occur in the following B1 cylinder.

Furthermore, when the A1 cylinder is rested, the intake valve 23 corresponding to the A1 cylinder is closed, and therefore an intake pipe pressure in the first bank 2A remains high. Hence, in the A3 cylinder, which serves as the first operating cylinder of the cylinders that belong to the same bank as the resting A1 cylinder and are connected to the common intake manifold 25A when the A1 cylinder is rested, a cylinder interior intake air amount is larger than normal. As a result, an output torque increases beyond a normal level. Similarly, the cylinder interior intake air amount and output torque of the B1 cylinder increase beyond normal levels when the B3 cylinder is rested.

Hence, the torque generation condition in the respective cylinders is as follows: A1 (resting)-B2 (torque reduction)-A3 (torque increase)-B3 (resting)-A2 (torque reduction)-B1 (torque increase), and thus, large and complicated torque variation occurs.

Furthermore, due to the intake pipe pressure pulsation (or fluctuation) described above, the actual EGR rate varies even when the condition of the EGR control valve 53 remains constant. More specifically, when the A1 cylinder is rested, it becomes more difficult to introduce EGR gas into the A3 cylinder, which is in a higher intake pipe pressure condition than normal at the start of an intake stroke, and as a result, the actual EGR rate falls below the target EGR rate. Conversely, the intake stroke occurs in the B2 cylinder of the second bank 2B immediately before the resting B3 cylinder and after the operating B1 cylinder, and therefore the intake pipe pressure of the B2 cylinder is unlikely to be higher than normal, making it comparatively easy to introduce EGR gas into the B2 cylinder.

Hence, in the four-cylinder operating mode, in which combustion occurs at unequal intervals, the actual EGR rate varies among the operating cylinders, and as a result, increases in vibration and noise may occur. In particular, the period of a vibration pattern that accompanies the torque variation described above differs from the period of a vibration pattern that accompanies variation in the actual EGR rate, and when vibration is generated with a complicated waveform obtained when the two vibration patterns are superposed, it may be impossible to suppress vibration and noise completely by controlling the operations of the first mount 61 and second mount 62.

Therefore, in this embodiment, vibration and noise are suppressed by limiting the EGR rate to a greater extent in the four-cylinder operating mode, in which combustion occurs at unequal intervals, than in the other operating modes (in particular, equal interval combustion partial cylinder operating modes such as the three-cylinder operating mode and the two-cylinder operating mode).

Next, a specific example of an operation of the engine 1 according to this embodiment will be described using flowcharts. Note that in the following description of the flowcharts and the drawings illustrating the flowcharts, "step" has been abbreviated to "S".

Figure 2:
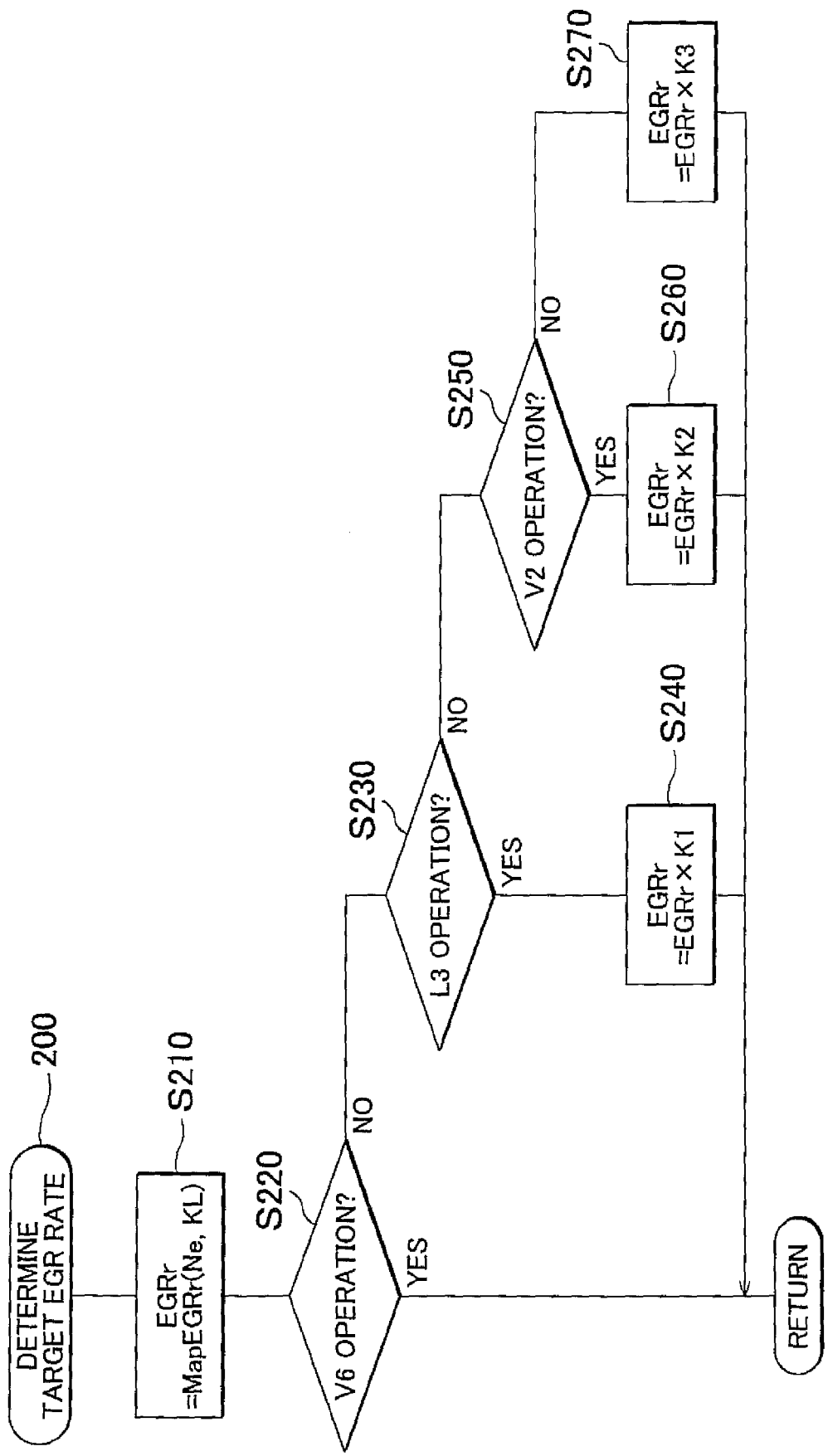
FIG. 2 is a flowchart showing an example of a target EGR rate determination routine executed by an ECU shown in FIG. 1.

FIG. 2 is a flowchart showing an example of a target EGR rate determination routine executed by the ECU 7 shown in FIG. 1. When a predetermined EGR implementation condition is established, the ECU 7 executes a target EGR rate determination routine 200 according to this example repeatedly whenever a crank angle reaches a predetermined value (90° Crank Angle (CA) Before Top Dead Center (BTDC), for example).

When the routine is executed, first, in S210, the target EGR rate (EGRr) is obtained using a map (MapEGRr) having an engine speed Ne, a load factor KL, and so on as parameters. The processing then advances to S220, in which a determination is made as to whether or not a current operating mode is the full cylinder operating mode. When the current operating mode is the full cylinder operating mode (S220=Yes), the routine is terminated. When the current operating mode corresponds to a partial cylinder operating state (S220=No), the processing advances to S230, in which a determination is made as to whether or not the current operating mode is the three-cylinder operating mode.

When the current operating mode is the three-cylinder operating mode (S230=Yes), the processing advances to S240, in which the target EGR rate is corrected by multiplying a predetermined coefficient K1(<1) by the target EGR rate obtained in S210. More specifically, in the three-cylinder operating mode, combustion occurs at equal intervals, but vibration tends to be slightly greater than in the full cylinder operating mode, and therefore the target EGR rate is set slightly lower than in the full cylinder operating mode. The routine is then terminated.

When the current operating mode corresponds to a partial cylinder operating state other than the three-cylinder operating mode (S230=No), the processing advances to S250, in which a determination is made as to whether or not the current operating mode is the two-cylinder operating mode.

When the current operating mode is the two-cylinder operating mode (S250=Yes), the processing advances to S260, in which the target EGR rate is corrected by multiplying a predetermined coefficient K2(<K1) by the target EGR rate obtained in S210. More specifically, in the two-cylinder operating mode, combustion occurs at equal intervals, but vibration tends to be slightly greater than in the full cylinder operating mode and the three-cylinder operating mode, and therefore the target EGR rate is set slightly lower than in these operating modes. The routine is then terminated.

When the current operating mode is the four-cylinder operating mode (S250=No), the processing advances to S270, in which the target EGR rate is corrected by multiplying a predetermined coefficient K3(<K2) by the target EGR rate obtained in S210. More specifically, in the four-cylinder operating mode, combustion occurs at unequal intervals, and therefore the target EGR rate is set slightly lower than in the two-cylinder operating mode, which is the equal interval combustion operating mode having the smallest number of operating cylinders. The routine is then terminated.

Hence, in this specific example, the target EGR rate is set lower in the four-cylinder operating mode, in which combustion occurs at unequal intervals, than in the other operating modes (including partial cylinder operations such as the two-cylinder operating mode) in which combustion occurs at equal intervals. As a result, the combustion condition during EGR implementation in the four-cylinder operating mode is stabilized to a maximum degree. Accordingly, vibration and noise can be suppressed more effectively in this operating mode.

Figure 3:
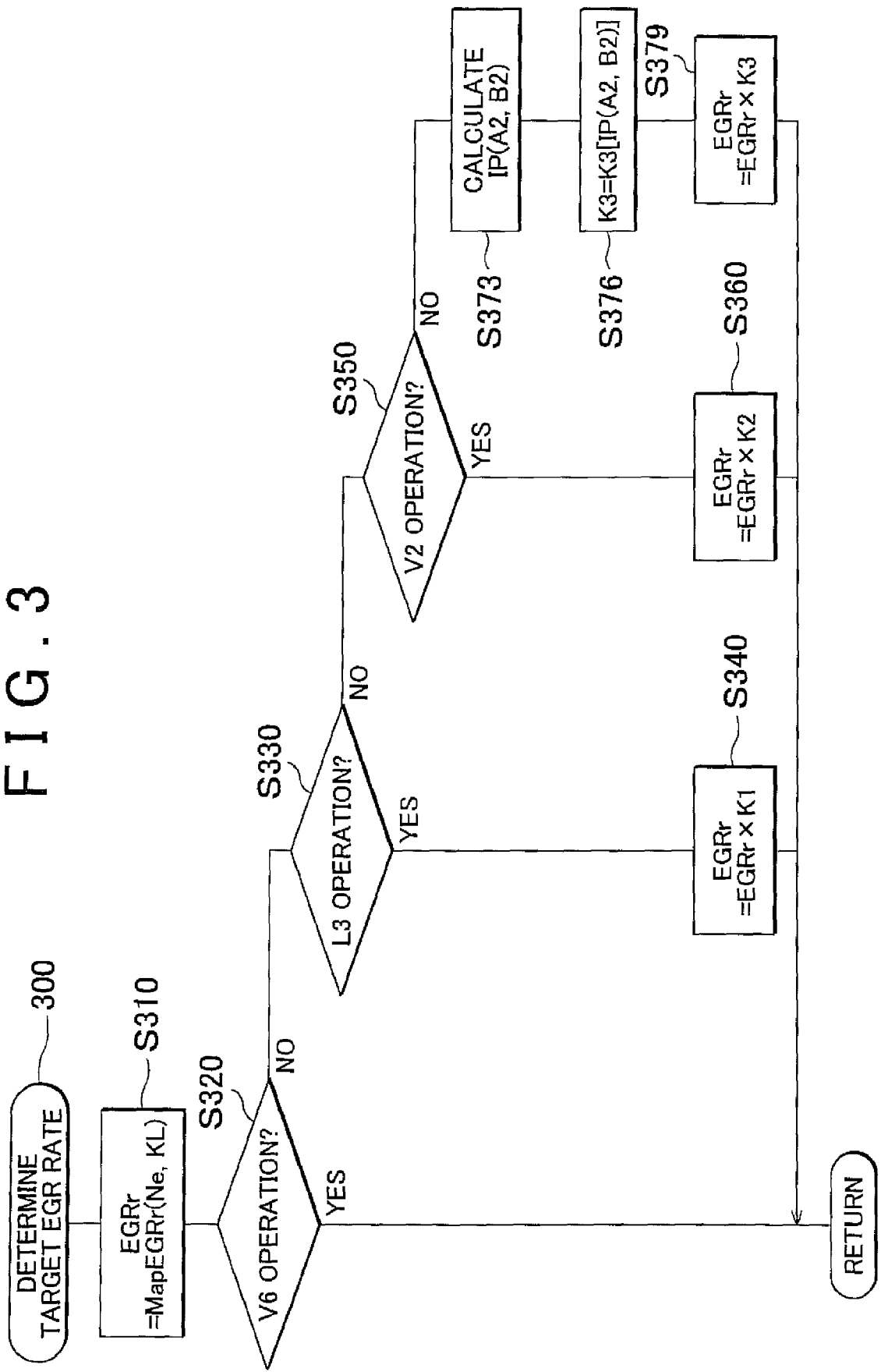
FIG. 3 is a flowchart showing another example of a target EGR rate determination routine executed by the ECU shown in FIG. 1.

FIG. 3 is a flowchart showing another specific example of a target EGR rate determination routine executed by the ECU 7 shown in FIG. 1. This target EGR rate determination routine 300 is a modification of the target EGR rate determination routine 200 according to the first specific example described above. More specifically, the processing of S310 to S360 in this routine 300 is identical to the processing of S210 to S260 in the routine 200 described above. Accordingly, the above description is incorporated in relation to this shared processing, and only differences with the above routine 200 will be described below.

When the current operating mode is the four-cylinder operating mode (S350=No), the processing advances to S373, in which an intake pipe pressure IP of the A2 cylinder and the B2 cylinder, which have the lowest intake pipe pressure (the highest actual EGR rate) of the operating cylinders, is obtained. Next, the processing advances to S376, in which the coefficient K3(<K2) is obtained using the intake pipe pressure IP and a map. The processing then advances to S379, in which the target EGR rate is corrected by multiplying the coefficient K3 by the target EGR rate obtained in S310. The routine is then terminated. Note that the map for obtaining the coefficient K3 is determined through experiment such that combustion variation and torque variation remain within an allowable range.

Hence, in this example, the target EGR rate is set in the four-cylinder operating mode, in which combustion occurs at unequal intervals, using as reference cylinders the cylinders A2 and B2, such that combustion variation in these reference cylinders is reduced favorably (combustion is performed with stability). The reference cylinders A2 and B2 have the highest actual EGR rate and each is operated immediately before the resting cylinder in the same bank in accordance with the ignition sequence. As a result, EGR can be implemented more favorably in the four-cylinder operating mode.

In the engine 1 of this embodiment, pumping loss can be reduced favorably by halting the intake valve 23 and exhaust valve 24 corresponding to the resting cylinder. As a result, a favorable fuel consumption characteristic is obtained.

In the engine 1 of this embodiment, the operating cylinders in the four-cylinder operating mode are rested in the two-cylinder operating mode and the resting cylinders in the four-cylinder operating mode are operated in the two-cylinder operating mode. In other words, the resting cylinders and operating cylinders are switched between the two-cylinder operating mode and the four-cylinder operating mode. As a result, bias in the cylinders that contribute to combustion can be suppressed to the greatest extent possible. Hence, in contrast to a case in which a specific cylinder is operated continuously for a great length of time or rested continuously for a great length of time, heat management is performed favorably.

In the engine 1 of this embodiment, the A3 cylinder and the B1 cylinder, which are disposed in diagonally opposing positions, are rested in the four-cylinder operating mode and operated in the two-cylinder operating mode. Therefore, symmetry is secured in the ignition (operating) cylinders and equal interval combustion is realized in the two-cylinder operating mode. As a result, vibration and noise can be suppressed to the greatest extent possible in both operating modes. Further, symmetry is secured as far as possible in heat generating locations, and therefore heat management can be performed favorably.

In the engine 1 of this embodiment, the EGR rate is suppressed in the four-cylinder operating mode, in which unequal interval combustion occurs, in comparison with the other operating modes (particularly the equal interval combustion partial cylinder operating modes including the three-cylinder operating mode and the two-cylinder operating mode). In so doing, vibration and noise can be suppressed effectively. Complicated vibration, which occurs when vibration accompanying torque variation and vibration accompanying variation in the actual EGR rate are superposed, is suppressed particularly favorably, and therefore the vibration generation condition is estimated favorably by the ECU 7. As a result, vibration and noise are suppressed effectively by the first mount 61 and the second mount 62.

Several modified examples will be described below. Note that where appropriate, all or a part of the plurality of embodiments and modified examples may be applied in a composite fashion within a range that is not technically contradictory.

There are no particular limitations on the mechanical constitution of the multi-cylinder engine to which the engine control method of the invention is applied.

For example, a gasoline engine, a diesel engine, a methanol engine, a bio-ethanol engine, or any other type of engine may be used. There are also no particular limitations on the number and arrangement (serial, V-type, horizontally opposed) of the cylinders. There are also no particular limitations on the fuel injection system (direction injection, port injection, or dual injection incorporating both systems). Further, an engine in which fuel is supplied by a carburetor rather than injected by an injector may be employed.

The V-type six-cylinder engine 1 according to the embodiment described above may be made capable of operating in three modes, namely the full cylinder operating mode, the four-cylinder operating mode, and the three-cylinder mode in which one of the banks is rested. In this case, the constitution for driving the intake valves 23 and exhaust valves 24 of the two constantly operated cylinders (for example, the B1 cylinder and the B2 cylinder) is set to be rocked constantly through rotational driving of a cam provided in the intake camshaft 41 and the exhaust camshaft 46. In other words, in this case, the constitution of the two constantly operated cylinders is simplified by omitting the sub-rocker arm and the connection switching unit such that the rocker arm is rocked by the camshaft.

The valve timing controller 42 may also be provided on the exhaust camshaft 46 side. In other words, the valve timing of the exhaust valve 24 may also be varied continuously.

In place of, or in addition to, the first mount 61 and second mount 62, the third mount 63 and fourth mount 64 may be used as active mounts. Alternatively, one of the first mount 61 and second mount 62 and one of the third mount 63 and fourth mount 64 may be used as active mounts.

The invention is not limited to the control method described in the above embodiments. For example, EGR rate control corresponding to the partial cylinder operating state may be performed when setting a correction value during EGR rate feedback control rather than setting the target EGR rate, as in the above embodiments.

The ignition cylinder sequence may be modified appropriately from the sequence described above. More specifically, the ignition sequence may be set as B1-A1-B2-A2-B3-A3. The processing content of S373 and S376 in the flowchart shown in FIG. 3 may be modified appropriately in accordance with this modification of the ignition sequence.

The valve timing and valve lift may be controlled to achieve a uniform cylinder interior intake air amount. Valve control to make the cylinder interior intake air amount uniform and adjustment of the ignition timing and so on described above may be performed in conjunction.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. An engine control device that includes an EGR mechanism for introducing exhaust gas into intake air and controls an operation of a multi-cylinder engine that is formed so as to be able to perform a partial cylinder operation in which combustion is halted in part of cylinders, comprising:

a cylinder rest state setting unit that switches between a first partial cylinder operating state, in which ignition intervals among a plurality of operating cylinders are unequal, and a second partial cylinder operating state, in which the ignition intervals are equal, in accordance with an operating condition; and an EGR rate control unit that sets an introduction rate at which the exhaust gas is introduced into the intake air to be lower in the first partial cylinder operating state than in the second partial cylinder operating state.

2. The engine control device according to claim 1, further comprising an active mount control unit that controls an operation of an active mount that supports the multi-cylinder engine elastically and generates vibration that counteracts vibration caused during an operation.

3. The engine control device according to claim 1, wherein the EGR rate control unit uses, as a reference cylinder, a cylinder in which the introduction rate is highest among the plurality of operating cylinders in the first partial cylinder operating state, and controls the introduction rate such that combustion variation in the reference cylinder is limited.

4. The engine control device according to claim 3, further comprising an active mount control unit that controls an operation of an active mount that supports the multi-cylinder engine elastically and generates vibration that counteracts vibration caused during an operation.

5. The engine control device according to claim 3, wherein the EGR rate control unit controls the introduction rate using, as the reference cylinder, a cylinder that is immediately before a resting cylinder in accordance with an ignition sequence among the plurality of operating cylinders connected to an intake manifold shared with the resting cylinder in the first partial cylinder operating state.

6. The engine control device according to claim 5, further comprising an active mount control unit that controls an operation of an active mount that supports the multi-cylinder engine elastically and generates vibration that counteracts vibration caused during an operation.

* * * * *